US011463232B2

(12) United States Patent
Ding et al.

(10) Patent No.: US 11,463,232 B2
(45) Date of Patent: Oct. 4, 2022

(54) SYSTEM AND METHOD FOR GENERATING TIME REFERENCE IN DUTY-CYCLED WIRELESS COMMUNICATIONS

(71) Applicant: Stichting IMEC Nederland, Eindhoven (NL)

(72) Inventors: Ming Ding, Eindhoven (NL); Yao-Hong Liu, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 17/142,214

(22) Filed: Jan. 5, 2021

(65) Prior Publication Data
US 2021/0218543 A1    Jul. 15, 2021

(30) Foreign Application Priority Data
Jan. 9, 2020    (EP) ..................................... 20150999

(51) Int. Cl.
*H04L 7/00*    (2006.01)
(52) U.S. Cl.
CPC .................. *H04L 7/0012* (2013.01)
(58) Field of Classification Search
CPC ....... H04W 4/02; H04W 4/023; H04W 84/18; H04L 67/10; H04L 7/0012
See application file for complete search history.

(56) References Cited

U.S. PATENT DOCUMENTS

| 2005/0088288 | A1* | 4/2005 | Pelliconi ................. G06F 13/42 340/286.02 |
| 2015/0082076 | A1* | 3/2015 | Jagmag ................. G06F 1/3203 713/600 |
| 2016/0295508 | A1* | 10/2016 | Berntsen ........... H04W 52/0216 |
| 2019/0058459 | A1 | 2/2019 | Khan et al. |
| 2019/0200311 | A1 | 6/2019 | Liu |

FOREIGN PATENT DOCUMENTS

| WO | 2017147591 A1 | 8/2017 |
| WO | 2019222695 A1 | 11/2019 |

OTHER PUBLICATIONS

Extended European Search Report and Written Opinion, EP Application 20150999.9, dated May 20, 2020, 9 pages.

* cited by examiner

*Primary Examiner* — Jamal Javaid
(74) *Attorney, Agent, or Firm* — McDonnell Boehnen Hulbert & Berghoff LLP

(57) ABSTRACT

A system is provided for generating a time reference in duty-cycled wireless communications. The system includes at least one master module including a master transceiver adapted to transmit data packets. The system further includes at least one slave module including a slave transceiver adapted to receive the data packets. The slave module further includes a signal generator adapted to generate a clock signal with a period equal to the time interval of two data packets transmitted by the master module. Moreover, the slave module further includes a slave timer adapted to utilize the clock signal as a time reference in order to perform the sleep/wakeup control for the slave module.

18 Claims, 6 Drawing Sheets

SYSTEM AND METHOD FOR GENERATING TIME REFERENCE IN DUTY-CYCLED WIRELESS COMMUNICATIONS

CROSS-REFERENCE TO RELATED APPLICATIONS

The present application is a non-provisional patent application claiming priority to European Patent Application No. 20150999.9, filed Jan. 9, 2020, the contents of which are hereby incorporated by reference.

FIELD OF THE DISCLOSURE

The disclosure relates to time reference generation in duty-cycled wireless communications, especially for generating wakeup time reference for duty-cycled wireless sensor nodes.

BACKGROUND

Wireless communication technology is gradually becoming popular in many new applications. For example, for implantable applications, sensors that are located inside a human body capture the biomedical metrics of the human body and send them out to external electronic equipment using wireless communication technology such as wireless radios. This greatly reduces the inconvenience for patients that is typically associated with conventional bulky equipment such as an endoscope. Furthermore, for disposable applications, a wireless device cannot be re-used and has to be thrown away afterwards.

In the above-mentioned applications, the wireless radio needs to be very small, namely in the millimeter scale, to be friendly to the human body. In addition, the cost of each tag needs to be very low. Moreover, a large link budget is desired due to high channel loss. Therefore, key requirements for those applications include but are not limited to extremely small Figure of Merit (FOM), extremely low cost, and adequate performance.

The requirements in implantable applications as well as in disposable applications raise challenges for a wireless radio because present wireless radios are much bigger and more expensive due to bulky off-chip components. For example, the most popular crystal quartz size is 3.2 mm by 2.5 mm, and the price for each crystal quartz is substantial enough to increase the overall cost of a radio. Generally, in a wireless radio, two crystal oscillators are required. One is for the system clock, which provides the frequency reference in order to define the communication channel. Other is for the wakeup timer, which performs the sleep/wakeup control for the whole chip, so that the chip operation is duty-cycled in order to reduce the power consumption and prolong battery lifetime.

Therefore, replacing the crystal-based oscillators with a less bulky arrangement or at least reducing the number of crystal quartz in a wireless radio is greatly demanded to make the wireless technology feasible for the aforementioned applications. For example, the document WO 2017/147591 A1 shows a crystal-less radio node operative as a slave node, where the system clock uses an RC oscillator. The frequency of the RC oscillator defines the RF carrier frequency. The slave node calibrates the RC oscillator and thus calibrates the RF carrier frequency of the slave node to the same of the master node. However, the crystal-less slave node does not comprise a wakeup timer to perform the sleep/wakeup control for the node. Without a wakeup timer, the slave node is required to be always active, which results in high power consumption and short battery lifetime.

SUMMARY

Accordingly, the disclosure includes a system and a method for generating wakeup time reference for duty-cycled wireless sensor nodes, which can help alleviate the aforementioned limitations.

According to a first aspect of the disclosure, a system is provided for generating time reference in duty-cycled wireless communications. The system comprises at least one master module comprising a master transceiver adapted to transmit data packets. The system further comprises at least one slave module comprising a slave transceiver adapted to receive the data packets. The slave module further comprises a signal generator adapted to generate a clock signal with a period equal to the time interval of two data packets transmitted by the master module. Moreover, the slave module further comprises a slave timer adapted to utilize the clock signal as a time reference in order to perform the sleep/wakeup control for the slave module.

Therefore, the disclosure includes a system comprising a slave module and its pair master module, where the slave module does not require crystal based oscillator to perform the sleep/wakeup control for the slave module. In order to enhance the precision of the wakeup timer without a crystal-based oscillator, the slave module generates a timing reference to control the frequency of the wakeup timer. Here, the slave module generates the timing reference indirectly corresponding to the master module by generating a clock signal based on the transmitted packet duration from the master module. Consequently, the system eliminates the requirement of having a crystal-based oscillator for the sleep/wakeup control for the slave module, thereby reducing the overall size and cost of the radio significantly.

According to a first implementation form of the first aspect of the disclosure, the slave module is implemented on a single integrated circuit whereby the slave timer comprises an on-chip oscillator. The on-chip oscillator can be implemented by means of a fully integrated complementary metal oxide semiconductor (CMOS) oscillator, for example, a fully integrated CMOS RC-oscillator. As such, the on-chip oscillator can alleviate the size and cost constraints for the radio.

According to a second implementation form of the first aspect of the disclosure, the master module is further adapted to transmit the data packet with a specific duty-cycle ratio and a specific time interval between two transmitted data packets. The duty cycled packet transmission facilitates effective sleep scheduling in order to mitigate the energy consumption due to idle listening and overhearing in the master and slave module.

According to a further implementation form of the first aspect of the disclosure, the master module further comprises a high precision clock such as a crystal oscillator or a microelectromechanical system (MEMS) based oscillator or a bulk acoustic wave (BAW) based oscillator, operating as a master timer. In this context, the master timer is adapted to generate a time reference in order to perform the sleep/wakeup control for the master module. Hence, the high precision clock in the master module generates a precise time reference for sleep/wakeup control for the master module. Since the slave module generates its sleep/wakeup time reference based on the time reference of the master module, the time reference in the slave module is also precise.

According to a further implementation form of the first aspect of the disclosure, the slave module is further adapted to detect the data packet by means of signal detection such as energy detection or preamble detection or synchronized frame detection. Therefore, the slave module detects the transmitted data packet through a signal detection technique depending on the nature of the application and that may or may not require a priori knowledge about the primary transmission.

According to a further implementation form of the first aspect of the disclosure, the signal generator is further adapted to set a flag signal to high if the data packet is detected and to reset the flag signal to zero upon completion, thereby generating the clock signal in a manner that the period equals the time interval of two data packets transmitted by the master module. Therefore, an accurate clock signal is generated in the slave module for sleep/wakeup control that indirectly corresponds to the high precision clock of the master module.

According to a further implementation form of the first aspect of the disclosure, the slave timer further comprises a calibration circuit adapted to calibrate the on-chip oscillator based on the flag signal. In other words, the accurate period of the flag signal is used as the time reference in order to calibrate the sleep/wakeup time control for the slave module.

According to a further implementation form of the first aspect of the disclosure, the frequency reference for the master module is defined by a high precision clock such as a crystal oscillator or a microelectromechanical system (MEMS) based oscillator or a bulk acoustic wave (BAW) based oscillator. The high precision clock precisely defines the RF carrier frequency for the master module.

According to a second aspect of the disclosure, a method is provided for generating time reference in duty-cycled wireless communications. The method comprises the act of transmitting data packets by at least one master module. The method further comprises the act of receiving the data packets by at least one slave module. Furthermore, the method comprises the act of generating a clock signal by a signal generator in the slave module with a period equal to the time interval of transmitting two data packets by the master module. Moreover, the method comprises the act of utilizing the clock signal by a slave timer in the slave module as a time reference in order to perform the sleep/wakeup control for the slave module. Therefore, the time reference to perform the sleep/wakeup control for the slave module is indirectly generated from the master module. The overall size and cost of the radio for the slave node are significantly reduced.

According to a first implementation form of the second aspect of the disclosure, the slave module is implemented on a single integrated circuit whereby the slave timer comprises an on-chip oscillator. The on-chip oscillator effectively addresses the size and cost constrains for the radio of the slave node.

According to a second implementation form of the second aspect of the disclosure, the method further comprises the act of transmitting the data packet from the master module with a specific duty-cycle ratio and a specific time interval between two transmitted data packets. Effective sleep scheduling can be performed for the master module and for the slave module thereby prolonging their operational lifetime.

According to a further implementation form of the second aspect of the disclosure, the method further comprises the act of generating a time reference by a high precision clock such as a crystal oscillator or a microelectromechanical system (MEMS) based oscillator or a bulk acoustic wave (BAW) based oscillator in the master module in order to perform the sleep/wakeup control for the master module. The time reference generated by the slave module is also precise since it is generated indirectly from the master module.

According to a further implementation form of the second aspect of the disclosure, the method further comprises the act of detecting the data packet by the slave module by means of signal detection such as energy detection or preamble detection or synchronized frame detection. The signal detection technique depends on the nature of application, which may or may not require a priori knowledge about the primary transmission.

According to a further implementation form of the second aspect of the disclosure, the method further comprises the act of setting a flag signal to high by the signal generator if the data packet is detected and an act of resetting the flag signal to zero upon completion, thereby generating the clock signal in a manner that the period equals to the time interval of two data packets transmitted by the master module. An accurate clock signal is generated in the slave module that indirectly corresponds to the high precision clock of the master module in order to perform the sleep/wakeup control for the slave module. In addition, the slave timer further comprises a calibration circuit and wherein the method further comprises the act of calibrating the on-chip oscillator by the calibration circuit with respect to the flag signal.

BRIEF DESCRIPTION OF THE FIGURES

The above, as well as additional, features will be better understood through the following illustrative and non-limiting detailed description of example embodiments, with reference to the appended drawings.

Embodiments of the disclosure are now further explained with respect to the drawings by way of example only, and not for limitation. In the drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Reference will now be made in detail to the embodiments of the present disclosure, examples of which are illustrated in the accompanying drawings. However, the following embodiments of the present disclosure may be variously modified and the range of the present disclosure is not limited by the following embodiments.

Figure 1:
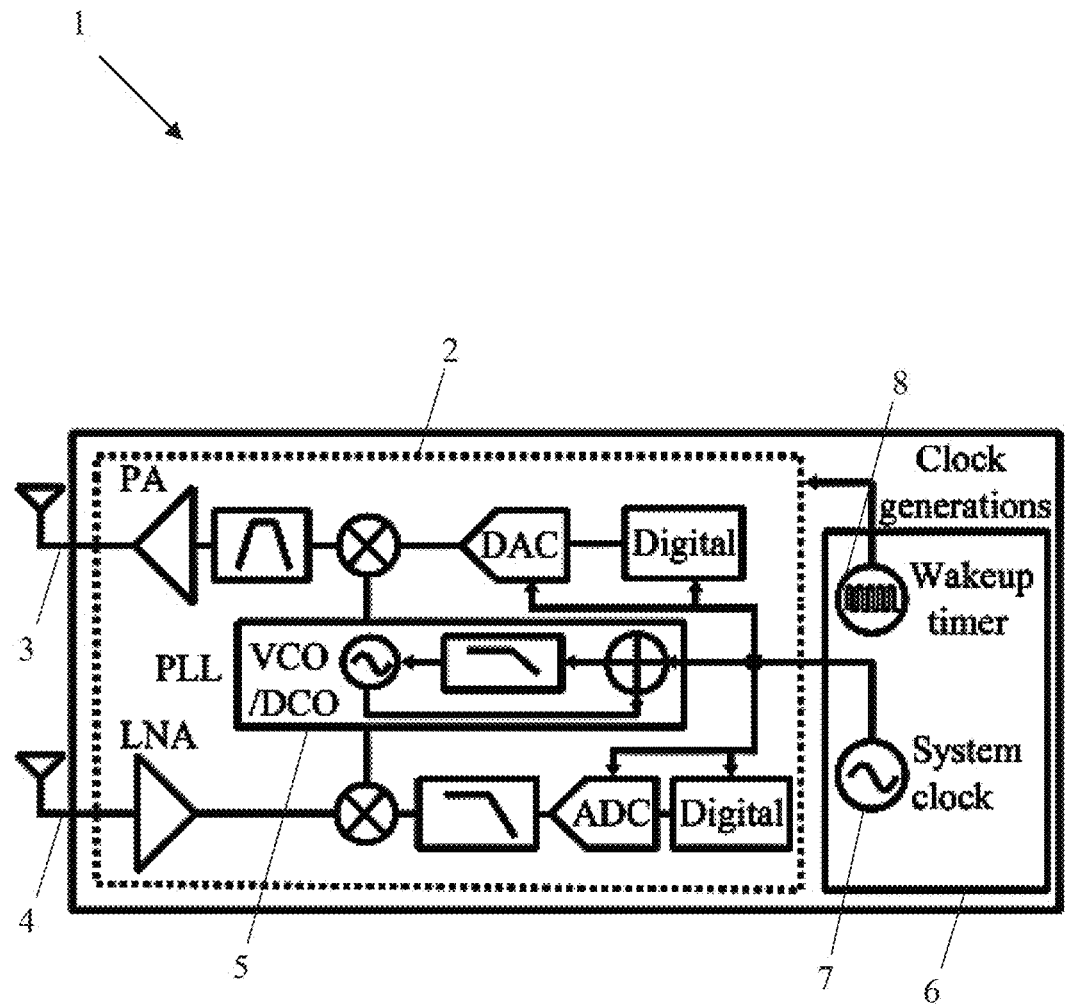
FIG. 1 is a schematic diagram of a wireless radio, according to an example.

In FIG. 1, a typical wireless radio 1, for instance, an Internet of Things (IoT) application radio is illustrated in blocks. Such a wireless radio 1 is operable as a master communicating node or module as well as a slave communicating node or module. Especially in duty-cycled wireless communications, the master node and the slave node are switched off most of the time, and only switched on during communication. In order to implement the duty-cycled communication, each node generally comprises a high precision clock (e.g., a crystal-based oscillator) that performs as a wakeup timer for the respective nodes. Once the master node and the slave node are synchronized, the wakeup timer for each node will start to count for the same amount of time and then switch on the radio at the same moment next time. In this way, the average system power consumption for both nodes is reduced.

Referring to FIG. 1, the radio 1 comprises wakeup timer 8 and system clock 7 arrangements. Ideally, the transmission end 3 and the reception end 4 with their mutual connection to the signal conditioning means, for instance, the phase-locked loop (PLL) 5 are realized on the chip 2. It is to be noted that the arrangement of the radio 1 is illustrated by way of an example only, and they may be expanded and/or altered based on the target application.

Herein, the clock generating means 6 comprises two crystal-based oscillators 7, 8. One oscillator 7 is to generate the system clock that provides the frequency reference for the PLL 5 in order to define the communication channel. The other oscillator 8 operates as a wakeup timer that performs the sleep/wakeup control for the whole chip 2 in order to maintain duty-cycled operation. The high precision clock generation means, such as a crystal-based oscillator or a MEMS-based oscillator, are known for their high performance. However, such oscillators cannot be fully integrated, for instance, in order to be fabricated in CMOS technology, which results in the larger area requirements for the radio 1. Moreover, the overall cost of the off-chip oscillators, e.g., the cost of two crystal-based oscillators 7, 8 in the radio 1, results in a higher cost per radio. Therefore, by reducing the number of off-chip oscillators 7, 8 in the radio 1, the overall area as well as the cost per radio can be significantly reduced.

Figure 2:
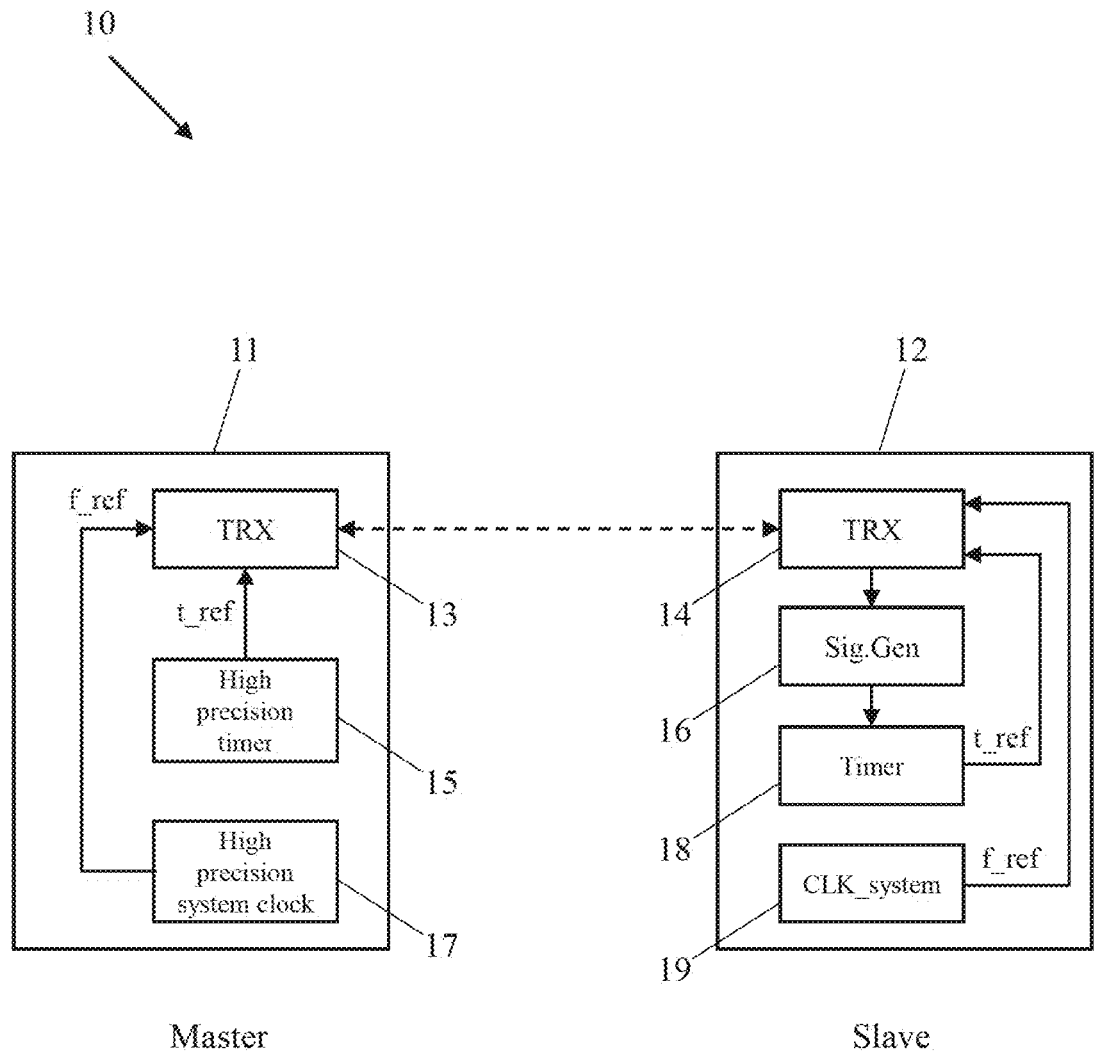
FIG. 2 is a schematic diagram of a system, according to an example.

In FIG. 2, an embodiment of the system 10 according to the first aspect of the disclosure is illustrated. The system 10 comprises a master module 11 and a slave module 12 wirelessly communicating with each other. The master module 11 comprises a master transceiver 13 and two high precision clocks 15, 17. Such high precision clocks 15, 17 can be realized by means of a crystal-based oscillator, a MEMS-based oscillator, or a BAW-based oscillator. A crystal-based oscillator generally shows superior performance over CMOS-based oscillators in terms of frequency, stability, and precision, however, the area requirement for integration is quite significant. A MEMS-based oscillator can generally be integrated better than the crystal-based oscillator with a minor sacrifice of overall performance.

The high precision clock 15 generating the time reference for the master module 11, hereinafter referred to as master timer 15, performs the sleep/wakeup control for the master module 11. The high precision clock 17 generating the frequency reference for the master module, hereinafter referred to as master system clock 17, defines the communication channel for the master module 11.

Similarly, the slave module 12 comprises a slave transceiver 14 and a high precision clock 19, hereinafter referred to as slave system clock 19, which generates the frequency reference for the slave module 12. As opposed to a dedicated high precision clock for generating the time reference in the slave module 12, the slave module comprises a signal generator 16 and a slave timer 18, collectively performing the sleep/wakeup control for the slave module 12. Here, the slave timer 18 comprises an on-chip oscillator, possibly a CMOS-based oscillator.

In this context, the master transceiver 13 of the master module 11 transmits a data packet, where the transmission is defined with a specific duty-cycle ratio and a time interval. The slave transceiver 14 of the slave module 12 receives the data packet and demodulates the signal. During the demodulation, the slave module 12 by means of the signal generator 16 generates a clock signal with a period equal to the duration of the transmitted data packet. In particular, the signal generator 16 sets a flag signal FLAG to high if the packet is detected and resets this FLAG to zero after the packet is finished. In this way, a clock signal FLAG is generated having a period equal to the duration of sending the data packet by the master module 11.

Due to the presence of the high precision clock in master module 11, e.g., a crystal-based oscillator, the master module 11 can accurately control the transmission duration. As such, the period of the clock signal FLAG in the slave module 12 is also accurate. The accurate period of the clock signal FLAG therefore can be used as a time reference in order to calibrate the sleep/wakeup time control for the slave module 12.

It is to be noted that the master transceiver 13 and the slave transceiver 14 comprise RF front ends for signal transmission and reception along with signal conditioning means, for instance, as illustrated in FIG. 1. Such building blocks are known in the art and therefore are not described in detail. The master module 11 and the slave module 12 further comprise sources of electrical energy, e.g., a photovoltaic cell or a battery, in order to power the respective modules 11, 12.

A stand-alone on-chip oscillator, e.g., a CMOS-based oscillator typically has much worse performance compared to a crystal-based oscillator, especially in terms of frequency stability. Having such an oscillator directly generating the time reference for the slave module 12 would generally lead to the consequence that the slave module 12 is required to be switched on much earlier in order not to miss the data packet from the master module 11. This is not desired since the longer on-time increases the power consumption of the slave module 12 and decreases the lifetime of the battery in the slave module 12.

Thus, the slave module 12 does not generate the time reference directly, but the time reference is indirectly generated from the master module 11 by means of the generated clock signal FLAG, which can be used to calibrate the sleep/wakeup control for the slave module 12. As a result, the restriction of having a high precision clock, e.g., a crystal-based oscillator, for wakeup time control in slave radios can be achieved, at the same time, a high performance for wakeup time control is possible.

Figure 3A:
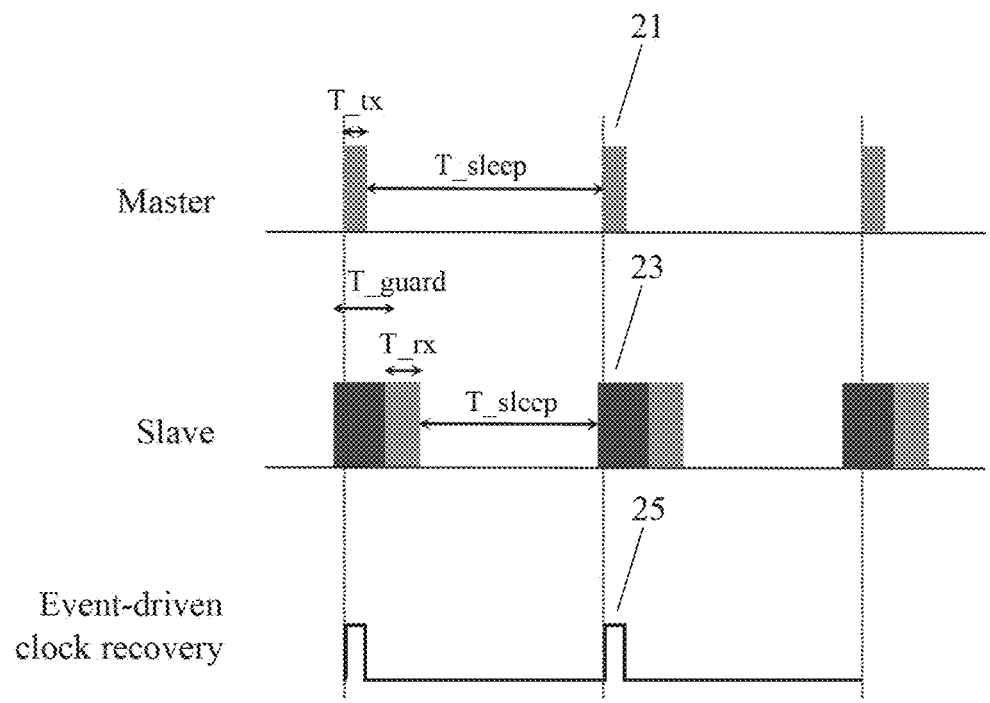
FIG. 3A is a timing diagram, according to an example.
Figure 3B:
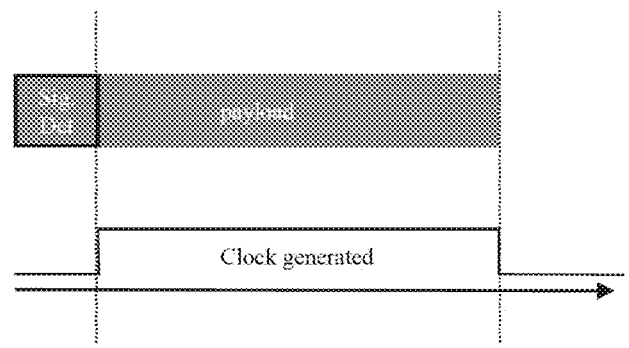
FIG. 3B is a timing diagram, according to an example.

In FIG. 3A and FIG. 3B, the proposed wakeup time reference generation is illustrated by way of an example. Particularly, in FIG. 3A, the duty-cycled communication between the master module 11 transmitting 21 the data packet and the slave module 12 receiving 23 the data packet is illustrated along with the event-driven recovered reference clock 25. Here, the duty-cycle ratio and the time interval are pre-defined, especially based on the nature of the application. With the help of the master timer 15, the master module 11 is maintained active during the transmission of the data packet over the transmission period T_tx. When the master module 11 is not transmitting, the master timer 15 disables the master module 11 by initiating sleep control over the non-transmission period T_sleep. Since the master timer 15 is able to generate high precision time reference for the sleep/wakeup control, the transmission duration and the sleep duration can be accurately controlled within the master module 11.

For reception of the transmitted data packet by the slave module 12, the proposed slave timer 18 generates the time reference based on the transmission duration of the data packet from the master module 11. The time reference for slave module 12 can be precisely based on the time reference for the master module 11, for instance, by receiving as low as two communication events from the master module 11. Consequently, the transmission duration T_tx and the sleep duration T_sleep can be effectively identified for the duty-cycled transmission of the data packet from the master module 11. However, due to the persistent frequency error, for instance, due to jitter or frequency variations, the receiving duration T_rx of the slave module 12 is extended with a guard duration T_guard, thereby the slave module 12 is switched on for a bit longer duration compared to the transmission duration T_tx.

In FIG. 3B, the proposed clock signal generation is illustrated in the time domain. Upon detecting the data packet from the master module 11, the slave module 12, particularly the signal generator 16, generates the clock signal with the period corresponding to the duration of the transmitted data packet. The signal detection operation can be based on energy detection or preamble detection or synchronized frame detection. While demodulating the signal, the signal generator 16 sets the flag signal FLAG to high at the detection time instant, maintains the level throughout the duration of the data packet length in time, and resets the flag signal to zero after the data packet is finished.

The proposed time reference generation can represent an improvement over any conventional reference calibration method, such as a calibration of slave references from master references, e.g., real time information, which are incorporated in the transmitted packet via time stamp. For such calibration schemes, the slave radio has to demodulate the whole packet in order to obtain the time stamp. Thus, if there is a packet error rate in communication, the packet demodulation cannot be executed accordingly and therefore the slave radio will not be able to retrieve the time stamp. However, this is not the case for the proposed reference calibration for the slave module 12.

As it can be seen from FIG. 3B, the whole data packet is not required to be demodulated, i.e., all data is not required to be demodulated in order to generate the clock signal as the time reference. If there is a bit error in the payload, the slave module 12 is still able to generate the clock signal. Hence, the proposed scheme generally suffers less from bit errors compared to the conventional calibration schemes. Moreover, due to the presence of a real time reference as a physical signal in the slave module 12, the proposed disclosure is not limited to only frequency-based feedback control but also can incorporate more accurate phase-based feedback control for calibrating the sleep/wakeup timing in the slave module 12.

Figure 4A:
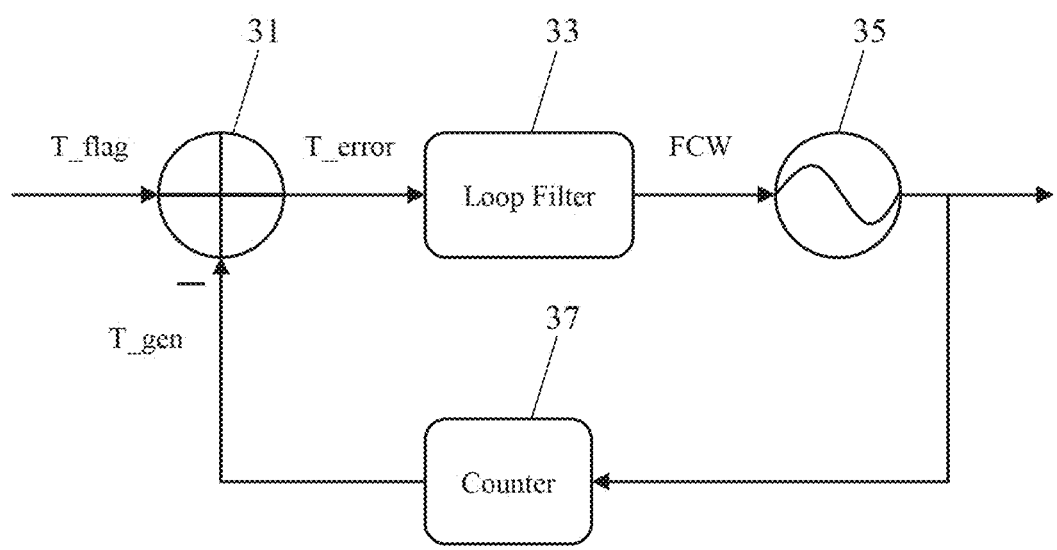
FIG. 4A is a schematic diagram of a calibrating scheme, according to an example.
Figure 4B:
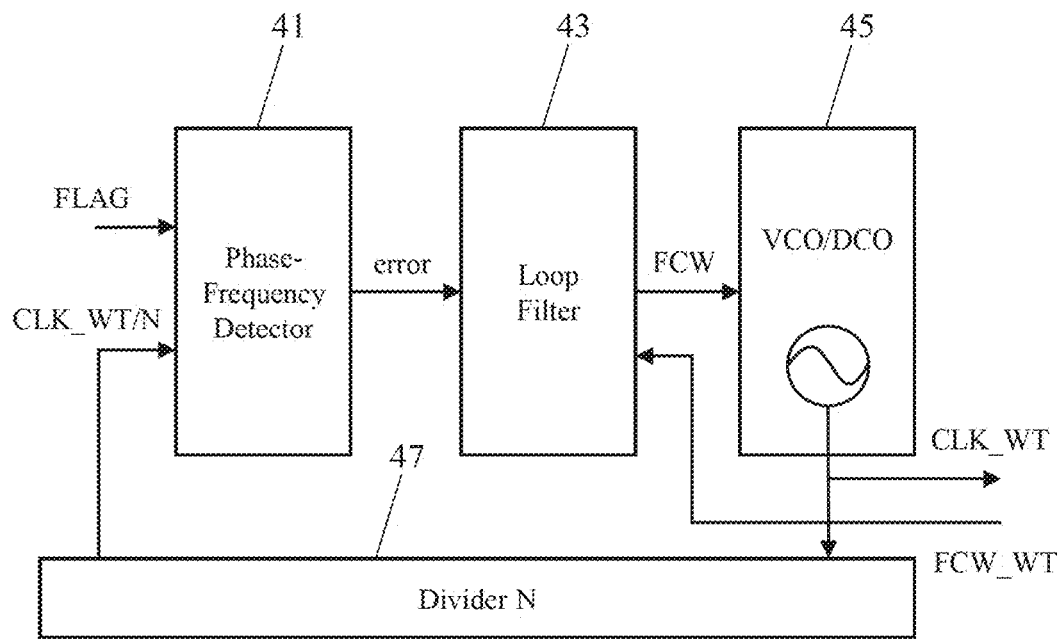
FIG. 4B is a schematic diagram of a calibrating scheme, according to an example.

In FIG. 4A and FIG. 4B, embodiments for calibrating the slave timer 18 are illustrated. In particular, FIG. 4A shows a first embodiment for calibrating the slave timer 18 by means of a frequency-locked loop (FLL). The forward path comprises a comparator 31 followed by a loop filter 33 that is further followed by an on-chip oscillator 35. The oscillator 35 output period is fed back to the comparator 31 through the feedback path via a counter 37. One or more of the comparator 31, the loop filter 33, the on-chip oscillator 35, or the counter 37 can individually or collectively be referred to as a calibration circuit.

The clock signal generated by the signal generator 16 is used as the time reference T_flag for the FLL and the mismatch between the time reference T_flag and the oscillator output T_gen results in the error period T_error. The error T_error is accurate since the time reference is indirectly generated from the master module 11 that has a high precision clock. As a result, the control signal FCW from the loop filter 33 based on the error T_error can effectively tune the output period of the oscillator 35 based on the reference period T_flag.

FIG. 4B shows a second embodiment for calibrating the slave timer 18 by means of a phase-locked loop (PLL). Such a calibration via a PLL is possible here since the slave module 12 generates the time reference by means of a physical clock signal FLAG The forward path comprises a phase-frequency detector (PFD) 41 followed by a loop filter 43 that is further followed by an on-chip oscillator 45. The oscillator output CLK_WT is fed back to the phase-frequency detector 41 through the feedback path via a divider 47.

The PFD 41 compares the phase and frequency of the clock signal FLAG to the phase and frequency of the scaled-down version of the oscillator output CLK_WT, thereby generating the error signal. The error signal is accurate since the clock signal FLAG is indirectly generated from the master module 11 that has a high precision clock. As a result, the loop filter 43 can accordingly tune the phase and frequency of the oscillator output CLK_WT based on the reference clock signal FLAG. One or more of the PFD 41, the loop filter 43, the on-chip oscillator 45, or the divider 47 can individually or collectively be referred to as a calibration circuit.

Figure 5:
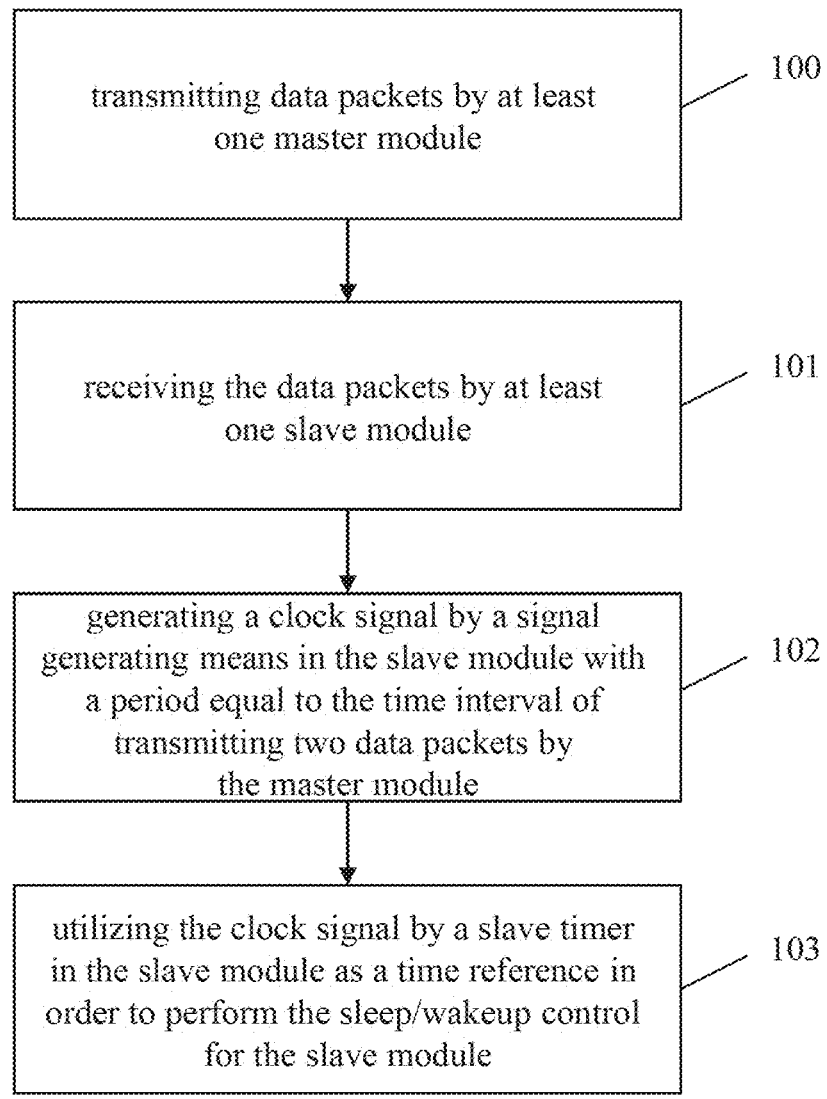
FIG. 5 is a block diagram of a method, according to an example.

In FIG. 5, an embodiment of the method according to the second aspect of the disclosure is illustrated. In a first act 100, data packets are transmitted by at least one master module. In a second act 101, the data packets are received by at least one slave module. In a third act 102, a clock signal is generated by a signal generator in the slave module with a period equal to the time interval of transmitting two data packets by the master module. Finally, in a fourth act 103, the clock signal is utilized by a slave timer in the slave module as a time reference in order to perform the sleep/wakeup control for the slave module.

The embodiments of the present disclosure can be implemented by hardware, software, or any combination thereof. Various embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

Although the disclosure has been illustrated and described with respect to one or more implementations, equivalent alterations and modifications will occur to others skilled in the art upon the reading and understanding of this specification and the drawings. In addition, while a particular feature of the disclosure may have been disclosed with respect to only one of several implementations, such feature may be combined with one or more other features of the other implementations as may be desired and advantageous for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A system for generating a time reference in duty-cycled wireless communications, the system comprising:
   a master module comprising a master transceiver adapted to transmit data packets; and
   a slave module comprising:
      a slave transceiver adapted to receive the data packets;
      a signal generator adapted to generate a clock signal with a period equal to a time interval of two of the data packets, wherein the signal generator is further adapted to set a flag signal in response to the data packets being detected and adapted to reset the flag signal upon completion of the data packets; and
      a slave timer adapted to utilize the clock signal to control the slave module, wherein the slave timer further comprises a calibration circuit adapted to calibrate the slave timer based on the flag signal.

2. The system of claim 1, wherein the slave timer is adapted to utilize the clock signal to wake the slave module.

3. The system of claim 1, wherein the slave timer is adapted to utilize the clock signal to cause the slave module to sleep.

4. The system according to claim 1, wherein the slave module is implemented on a single integrated circuit.

5. The system according to claim 1, wherein the slave timer comprises an on-chip oscillator.

6. The system according to claim 1, wherein the master module is further adapted to transmit the data packets with a specific duty-cycle ratio and a specific time interval between the data packets.

7. The system according to claim 1, wherein the master module further comprises a master timer adapted to generate a time reference to control the master module.

8. The system according to claim 1, wherein the slave module is further adapted to detect the data packets via signal detection, energy detection, preamble detection, or synchronized frame detection.

9. The system according to claim 1, wherein the signal generator is further adapted to set a flag signal to high in response to the data packets being detected and adapted to reset the flag signal to zero upon completion of the data packets, thereby generating the clock signal such that the period is equal to the time interval.

10. The system according to claim 1, wherein a frequency reference for the master module or the slave module is defined by a crystal oscillator, a microelectromechanical system (MEMS) based oscillator, or a bulk acoustic wave (BAW) based oscillator.

11. A method for generating a time reference in duty-cycled wireless communications, the method comprising:
   transmitting data packets by a master module;
   receiving the data packets by a slave module;
   setting a flag signal in response to the data packets being detected and resetting the flag signal upon completion of the data packets;
   generating a clock signal by a signal generator of the slave module, the clock signal having a period equal to a time interval of two data packets transmitted by the master module;
   utilizing the clock signal by a slave timer of the slave module to control the slave module; and
   calibrating the slave timer based on the flag signal.

12. The method of claim 11, wherein utilizing the clock signal to control the slave module comprises utilizing the clock signal to wake the slave module.

13. The method of claim 11, wherein utilizing the clock signal to control the slave module comprises utilizing the clock signal to cause the slave module to sleep.

14. The method according to claim 11, wherein the slave module is implemented on a single integrated circuit.

15. The method according to claim 11, wherein transmitting the data packets further comprises transmitting the data packets from the master module with a specific duty-cycle ratio and a specific time interval between the data packets.

16. The method according to claim 11, wherein the master module includes a crystal oscillator, a microelectromechanical system (MEMS) based oscillator, or a bulk acoustic wave (BAW) based oscillator.

17. The method according to claim 11, further comprising detecting the data packets via signal detection, energy detection, preamble detection, or synchronized frame detection.

18. The method according to claim 11, wherein setting the flag signal comprises setting the flag signal to high in response to the data packets being detected and resetting the flag signal comprises resetting the flag signal to zero upon completion of the data packets, thereby generating the clock signal such that the period is equal to the time interval.

* * * * *